United States Patent Office 3,397,220
Patented Aug. 13, 1968

3,397,220
SILYLATING PROCESS AND AGENT
Johann F. Klebe, Schenectady, N.Y., assignor to General Electric Company, a corporation of New York
No Drawing. Continuation-in-part of application Ser. No. 371,095, May 28, 1964. This application Sept. 23, 1964, Ser. No. 398,781
12 Claims. (Cl. 260—448.2)

ABSTRACT OF THE DISCLOSURE

Compounds containing acidic protons are silylated by reacting the compounds containing acidic protons with a silyl compound having the formula

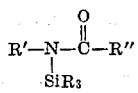

wherein R, R' and R" are monovalent hydrocarbon radicals, R' is in addition hydrogen and the —SiR₃ radical and R" in addition is hydrogen and the

radical, wherein Z is selected from the class consisting of hydrogen, monovalent hydrocarbon radicals, and the aforesaid —SiR₃ group. The process of this reaction is useful for the separation and analysis of organic compounds containing acidic protons.

---

This application is a continuation-in-part of my application, Ser. No. 371,095, filed May 28, 1964, now abandoned, and assigned to the same assignee as the present invention.

This invention is concerned with a process for transferring silyl groups onto certain classes of compounds to make silylated derivatives. More particularly, the invention relates to a process for silylating compounds containing acidic protons which comprises reacting the latter compounds with a silyl compound having the formula I 

where R, R' and R" are monovalent hydrocarbon radicals, R' is in addition hydrogen and the —SiR₃ radical and R" in addition is hydrogen and the

radical, where Z is selected from the class consisting of hydrogen, monovalent hydrocarbon radicals, and the aforesaid —SiR₃ group, with R having the meaning above, and thereafter obtaining a compound whose acidic proton (hydrogen) is substituted with a —SiR₃ group. The invention also includes the compound N,N-bis(trimethylsilyl) formamide.

The term "silyl group" is intended to mean the grouping —SiR₃ where R has the meaning given above.

The term "compound having acidic protons" is intended to mean organic compositions which have attached to a carbon atom thereof acidic-hydrogen-containing groups such as amines, amides, carboxyl groups, aliphatic alcoholic hydroxyl groups, phenolic hydroxyl groups, silanol groups, etc.; as well as compounds containing carbon-bonded acidic hydrogens, e.g., nitromethane, nitropropane, malononitrile, etc.

The term "silyl donor" is intended to mean compounds of Formula I, while the term "silyl acceptor" is intended to mean the organic compound containing the acidic proton.

Silylation of amines, amides, lactams, carbamates, ureas, peptides, and compounds containing hydroxyl functions has become a valuable tool for separation and analysis. Replacing the protons by silyl groups can lead to derivatives of considerably higher vapor pressure which after distillation or vapor chromatographic separation can readily be converted into the starting materials.

The silylation reactions are often desired to make derivatives of mixtures of compounds which are difficultly separable from each other because of a high degree of hydrogen bonding, which does not permit separation of the individual components by distillation; on the other hand, the silyl derivatives of many compounds have sufficiently lower boiling points thereby permitting ready distillation or other physical separation.

In the past, the silylation reaction has involved the use of silyl donors which react sluggishly if at all at room temperature with the silyl acceptors and it is only by employing relatively high temperatures well above 100° C. that any desirable rate of reaction is accomplished. Moreover, even if elevated temperatures are employed, it usually requires relatively long periods of heating between the silyl donor and the silyl acceptor to effect the exchange of the silyl group, due in some respects to the necessity of removing lower boiling amines resulting from the use of silylated amines as the silyl donor. Very often, the silyl acceptor suffers deleteriously if exposed to elevated temperatures, and this has often limited the use of many silyl donors.

It is accordingly one of the objects of this invention to effect a silylation reaction of compounds containing acidic protons.

It is still a further object of this invention to effect exchange of silyl groups between silyl donors and silyl acceptors rapidly and employing less drastic conditions than has heretofore been required.

It is a still further object of the invention to effect silylation of compounds which can then be separated, purified, or otherwise processed and the silyl group thereafter readily removed to obtain the compounds free of the silyl group.

It is another object of the invention to effect silylation of compounds which heretofore could not be effected even under drastic conditions.

Other objects of the invention will become more apparent from the discussion which follows.

Among the monovalent hydrocarbon radicals which R, R', R" and Z in Formula I may be are, for instance, alkyl radicals (e.g., methyl, ethyl, propyl, isopropyl, pentyl, octyl, dodecyl, etc., radicals); alkenyl radicals (e.g., vinyl, allyl, crotyl, etc., radicals); aryl radicals (e.g., phenyl, naphthyl, biphenyl, etc. radicals); aralkyl radicals (e.g., benzyl, phenylethyl, etc., radicals); alkaryl radicals (e.g., xylyl, tolyl, ethylphenyl, methylnaphthyl, etc., radicals); cycloaliphatic (including unsaturated) radicals (e.g., cyclopentyl, cyclohexyl, cyclopentenyl, cyclohexenyl, etc., radicals); etc. It is readily apparent that the illustrated radicals all contain no more than 12 carbon atoms.

There are numerous ways for making compounds having the formula

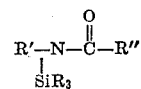

and used as the silyl donor. If R, R' and R" are monovalent hydrocarbon radicals, then one can make the compounds of Formula I by reacting a triorganosilyl halide of the formula R₃SiX with a compound of the formula

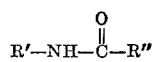

in about equimolar proportions in the presence of a hydrohalide acceptor, often at ambient temperatures.

If R' in Formula I is desired to be a —SiR₃ radical and R is desired to be a monovalent hydrocarbon radical, then one can react in a molar ratio of 2 mols of the triorganosilyl halide R₃SiX with 1 mol of a compound of the formula

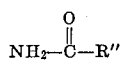

When R'' is desired to be the

and R' is desired to be a monovalent hydrocarbon radical in Formula I, one can react an organocyanate of the formula R'NCO with a compound of the formula

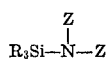

in the manner described in my copending application, Ser. No. 371,119, filed May 24, 1964 and assigned to the same assignee as the present invention, now U.S. Patent 3,346,609, issued Oct. 10, 1967. By reference, this application is made part of the disclosures and teachings of the instant application as to compounds of Formula I and methods for making such compounds.

If R' in Formula I is hydrogen, and R and R'' are monovalent hydrocarbon radicals and R'' in addition is the

radical, then one can make compounds of this type by reacting one mol of a triorganosilyl halide of the formula R₃SiX with one mol of a compound of the formula

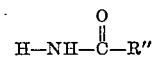

in the presence of a hydrohalide acceptor, to give compounds of formula

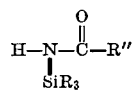

If R'' in Formula I is hydrogen, R and R' are monovalent hydrocarbon radicals and R' is in addition the —SiR₃ radical, then one can make the compounds of this type by reacting a triorganosilyl halide of the formula R₃SiX with a compound of the formula

in about equimolar proportions in the presence of a hydrogen hydrohalide acceptor to give a compound having the formula

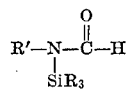

If in Formula I, R' and R'' are both hydrogen, then to arrive at such a formula, one would react equimolar proportions of a triorganosilyl halide of the formula R₃SiX with a compound of the formula

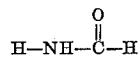

thereby giving a compound of the formula

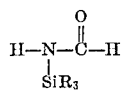

In all the syntheses recited above for making compounds of Formula I, anhydrous conditions are employed and the representations for R, R', R'' and Z have the meanings given previously. Among the hydrohalide acceptors which may be employed in the process for making the compounds of Formula I described above are, for instance, pyridine, triethylamine, tributylamine, etc. Persons skilled in the art will have no difficulty in determining how to make the silyl donors of Formula I from the examples which follow and from prior art references which are more than adequate for the purpose. It is also apparent that the above directions provide for obvious variations depending on the starting materials and the representations for R, R', and R''.

Typical of the conditions under which one can make silyl donors of Formula I may be mentioned the following illustrative syntheses:

One mol trimethylchlorosilane is reacted with one mol N-methylacetamide in the presence of pyridine to obtain a composition having the formula

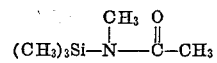

This reaction readily takes place upon mixing the ingredients and heating to a temperature of from about 50–80° C., after which the salt of the hydrohalide acceptor is removed and any excess of the reaction products is removed and the desired product isolated.

Other reactions for making compositions used as a silyl donor involves reacting 2 mols of trimethylchlorosilane and 1 mol of acetamide to give the composition having the formula

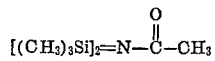

again employing a hydrohalide acceptor and essentially the same conditions as described above.

When R'' is desired to be the

radical this can be accomplished by reacting, for example, phenylisocyanate with trimethylsilyldimethylamine to give a composition in accordance with my above-identified patent application having the formula

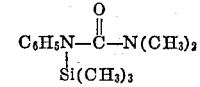

When R' is desired to be hydrogen, this can be accomplished by reacting for example 1 mol of trimethylchlorosilane with 1 mol of acetamide in the presence of pyridine to obtain a composition having the formula

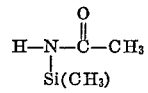

This reaction occurs readily, merely by mixing the ingredients and heating them to somewhat above room temperature. As pointed out above, the salt of the hydrohalide acceptor is removed and the desired product isolated.

When R' and R'' are both desired to be hydrogen, this can be accomplished by reacting, for example, one mol of trimethylchlorosilane with one mol formamide to form the compound

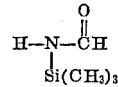

using the same conditions as recited above. If N-methylformamide is employed, the reaction of trimethylchlorosilane under such conditions would give the compound

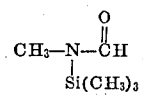

It will of course be apparent to those skilled in the art that various other means can be employed to make the compositions of Formula I. In addition to trimethylchlorosilane, the triorganosilyl group can be, for example, triphenylchlorosilane, tribenzylchlorosilane, triphenylbromosilane, trixylylbromosilane, triethylchlorosilane tributylchlorosilane, etc. Furthermore, various other organoisocyanates (e.g., toluene isocyanate, benzyl isocyanate, ethyl isocyanate, butyl isocyanate, etc.), as well as various triorganosilylamines (trimethylsilylamine, triphenylsilylamine, N-methyl trimethylsilylamine, etc.); various amides, etc., may be used for the purpose.

Included among the slyl acceptor compounds may be mentioned, for instance, alcohols (e.g., ethanol, isopropanol, butanol, octanol, etc.); phenols (e.g., phenol, xylenol, cresol, ethylphenol, naphthol, etc.); amines (e.g., ethylamine, propylamine, dibutylamine, aniline, etc.); acids (e.g., acetic, propionic, butyric, benzylic, toluic, etc., acids); amides (e.g., acetamide, propionamide, benzamide, etc.); ureas (e.g., urea, diphenylurea, thiourea, diethylurea, etc.); aminoacids (e.g., glycine, alanine, cysteine, histidine, etc.); sugars (e.g., sucrose, lactose, fructose, glucose, etc.); lactams; peptides; etc.

The silylation reaction of the present invention can be be carried out by simply mixing the silyl donor and the silyl acceptor compounds in a suitable colvent (usually in equimolar proportions although from 0.01 to 3 or more molar excesses of each compound can be used), for instance, acetonitrile, acetone, chloroform, chlorobenzene, tetrachloroethane, carbon tetrachloride, benzene, etc., stirring the mixture preferably at room temperature, about 20–30° C., and alternatively, if desired, at elevated temperatures of from about 30–100° C. or higher and thereafter isolating the silylated compound. In many instances equilibrium reaction lies in the direction of the desired silylated product; whereas in some instances equilibrium can be shifted to the product side (i.e., silylated organic compound) by allowing the desilylated donor compound to crystallize in the reaction mixture after its silyl group is transferred to the silyl acceptor compound. The separation of the product can be achieved by the usual means, for instance, extraction, sublimation, distillation, etc. The silylation reaction usually goes in a matter of minutes and, in some instances, as fast as the time required for mixing the silyl donor and the silyl acceptor compounds. although under such conditions, very often the yield of silylated compound is either high or essentially quantitative, essentially complete conversion to the desired silylated compound is insured by continuing to stir the reaction mixture for times ranging from about 1 hour to 15 hours or more. I have found that the presence of more than one triorganosilyl group on a nitrogen of the donor compound increases the silylating reactivity of the donor compound.

In order that those skilled in the art may better understand how the present invention may be practiced, the following examples are given by way of illustration and not by way of limitation. All parts are by weight, unless otherwise stated. Where analyses are given the values in parentheses are the theoretical values for the elements. Anhydrous conditions were observed in all examples.

Example 1

N-trimethylsilyl-N,N'-diphenylurea was prepared by mixing 11.9 grams phenylisocyanate and 16.5 grams N-trimethylsilylaniline (which in turn was prepared by reacting aniline with trimethylchlorosilane in equimolar proportions) in 10 cc. of dry hexane, and this mixture was allowed to stand at room temperature (about 25–30° C.) for about 15 hours. The white crystalline product which precipitated was removed by filtration, washed with dry hexane and dried. This yielded a product melting at 77–79° C., and was identified as being the desired compound as evidenced by the following analytical results: percent C: 67.5 (67.5): percent H; 6.9 (7.1); percent N: 9.8 (9.8). This compound will hereinafter be identified as "silyl donor compound No. 1."

Example 2

The compound bis(trimethylsilyl)acetamide having the formula

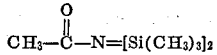

which is known to exist in an equilibrium relationship with its tautomeric form

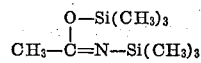

was prepared by mixing together 59 grams acetamide with 250 grams trimethylchlorosilane in 250 grams of triethylamine. The mixture was heated at its reflux temperature with stirring under anhydrous conditions for about 15 hours. After cooling, 500 cc. of diethyl ether was added to facilitate filtration. The filtrate (separated from the hydrohalide acceptor salt) was fractionally distilled to give bis(trimethylsilylacetamide boiling at 71–73° C./35 mm. This compound will hereinafter be identified as "silyl donor compound No. 2."

Example 3

To a stirred solution of 10.3 grams of trimethylsilylmethylamine (prepared similarly as in Example 1 by reacting trimethylchlorosilane with methyl amine) in 20 cc. anhydrous hexane was added slowly 11.9 grams of freshly distilled phenylisocyanate over a period of 10 minutes during which time the temperature of the mixture rose to about 70° C. After cooling to room temperature, a mass of colorless crystals were obtained and separated. Subsequent purification gave a product melting at 72–75° C. This material was identified as having the formula

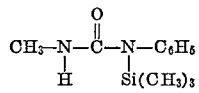

as evidenced by the analyses which were as follows: percent C; 59.4 (59.4); percent H: 8.1 (8.2); percent N: 12.7 (12.6).

Example 4

In this example phenylisocyanate was reacted with bis(trimethylsilyl)methylamine (prepared by reacting 2 mols trimethylchlorosilane with 1 mol methylamine) in the same manner as in Example 3 to produce N-methyl-N'-phenyl-N,N'-bis(trimethylsilyl)urea having the formula

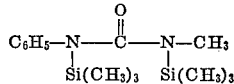

whose identity was established by the following analysis: percent C: 56.6 (57.0); percent H: 8.9 (8.9); percent N: 9.8 (9.5); percent Si: 19.3 (19.1).

Example 5

About 2.27 parts N-(dimethylphenylsilyl)aniline (prepared by reacting dimethylphenylchlorosilane with aniline) were mixed with 1.19 parts of phenylisocyanate and heated at 150° C. in an atmosphere of dry nitrogen with stirring for about 1 hour. The product thus obtained was recrystallized from a dry mixture of a 1:1 weight ratio of hexane and benzene to give a product melting at 111–113° C. This composition was identified as having the formula

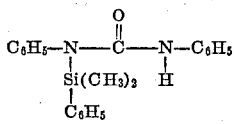

as evidenced by the analyses which were as follows: percent C: 73.1 (72.8); percent H: 6.4 (6.4); percent N: 7.7 (8.1); percent Si: 7.7 (8.1).

Example 6

In this example additional compositions coming within the scope of Formula I were prepared similarly as in the preceding examples employing various isocyanates and different silylamines. The following Table 1 shows the ingredients used to prepare these silylureas (silyl donors) together with the formulas of the final compositions, while Table 2 shows the analyses for these silylureas, establishing that the compositions were in fact obtained.

methylsilyl piperidine. Each of the silyl donors was reacted in equimolar concentrations with the silyl acceptor.

The following equations show the reactions as they were carried out, together with a notation under each equation as to the rate or non-reactivity of the reagents:

a. 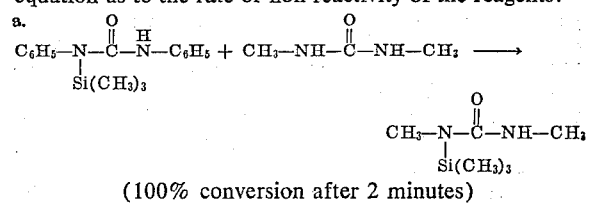

(100% conversion after 2 minutes)

TABLE 1

| Test No. | *Amine Reactant | Isocyanate | Product |
|---|---|---|---|
| 6a | $(CH_3)_2N-Si(CH_3)_3$ | $C_6H_5NCO$ | $C_6H_5-N(Si(CH_3)_3)-C(=O)-N(CH_3)_2$ |
| 6b | $(CH_3)(C_6H_5)N-Si(CH_3)_3$ | $C_6H_5NCO$ | $C_6H_5-N(Si(CH_3)_3)-C(=O)-N(CH_3)-C_6H_5$ |
| 6c | $(CH_3)_2N-Si(CH_3)_3$ | $p-CH_3C_6H_4NCO$ | $p-CH_3-C_6H_4-N(Si(CH_3)_3)-C(=O)-N(CH_3)_2$ |
| 6d | $C_6H_{11}-NH-Si(CH_3)_2C_6H_5$ | $C_6H_5NCO$ | $C_6H_5-N(Si(CH_3)_2C_6H_5)-C(=O)-NH-C_6H_{11}$ |
| 6e | $C_6H_5-NH-Si(CH_3)_3$ | $m-CH_3C_6H_4NCO$ | $m-CH_3C_6H_4-N(Si(CH_3)_3)-C(=O)-NH-C_6H_5$ |
| 6f | $CH_3-NH-Si(CH_3)_3$ | $m-CH_3C_6H_4NCO$ | $m-CH_3-C_6H_4-N(Si(CH_3)_3)-C(=O)-NHCH_3$ |
| 6g | $NH-[Si(CH_3)_3]_2$ | $C_6H_5NCO$ | $C_6H_5-N(Si(CH_3)_3)-C(=O)-NHSi(CH_3)_3$ |

*The amine reactants were prepared by reacting a trihydrocarbon substituted chlorosilane, e.g., $(CH_3)_3SiCl$ or $(CH_3)_2C_6H_5SiCl$ with the appropriate amine containing a primary hydrogen to effect removal of HCl and substitution of the trihydrocarbon-substituted silyl group in place of the hydrogen.

TABLE 2

| Product Test No. | Melting Point, °C. | Analyses, Percent Elements Observed/Calculated | | | |
|---|---|---|---|---|---|
| | | C | H | N | Si |
| 6a | 56–59 | 60.9/61.0 | 8.4/8.5 | 12.0/11.9 | 11.6/11.9 |
| 6b | 56–60 | 68.7/68.4 | 7.3/7.4 | 9.3/9.4 | 9.8/9.4 |
| 6c | (¹) | | | 11.4/11.2 | 11.4/11.2 |
| 6d | 77 | 71.9/71.6 | 7.7/7.9 | 7.8/7.9 | |
| 6e | 58–59 | 68.7/68.4 | 7.4/7.4 | 9.6/9.4 | 9.5/9.4 |
| 6f | 72–80 | 60.2/61.0 | 8.6/8.5 | 12.4/11.8 | 11.9/11.9 |
| 6g | 69–71 | | | | 20.1/20.0 |

¹ B.p. 80–82° C./0.5 mm.

The following examples illustrate the use of silyl donor compounds for silylating organic compositions containing acidic protons. Anhydrous conditions were observed throughout the silylation reaction.

Example 7

This example ilustrates the speed with which the silylating agent of the present invention can effect silylation as compared to the more sluggish, or even non-reactive rates of other silylating agents. More particularly, N,N'-dimethylurea was reacted with four different silylating agents, namely, N,N' - diphenyltrimethylsilylurea, N-trimethylsilylaniline, bis - (trimethylsilyl)amine, and tri-

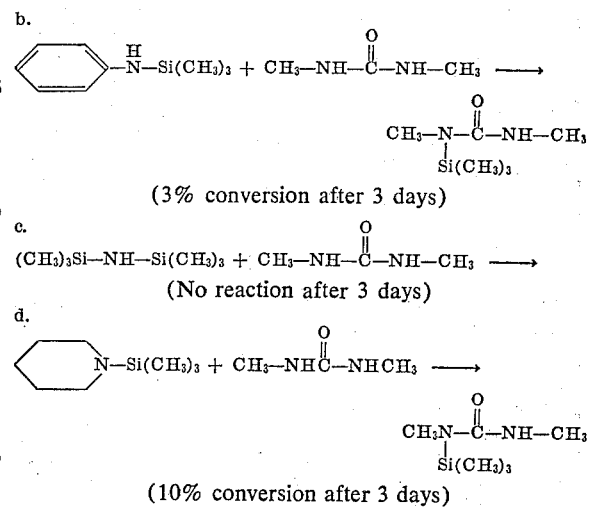

All of the above three reactions were carried out with stirring under the same conditions of room temperature and using acetonitrile as the solvent in which the reactants were interacted. Where reaction took place in equations a, b and d, the by-products were N,N'-diphenylurea, aniline and piperidine, respectively.

Example 8

A mixture of 5.7 grams of silyl donor compound No. 1 and 10 grams of nitromethane (which was employed both as a reactant and solvent) was allowed to remain at room temperature for about 3 days. The precipitate of diphenylurea was removed by filtration and the filtrate was fractionally distilled to give bis(trimethylsilyl)methazonic boiling at 50–52° C./0.5 mm. and having the formula

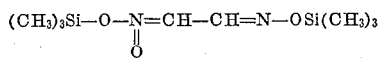

This compound was identified by analyses, which showed: percent C: 39.0 (38.7); percent H: 8.0 (8.1); percent N: 11.3 (11.3).

Example 9 a mixture of 6.6 grams of malononitrile and 28.4 grams of silyl donor compound No. 1 in 50 cc. of dry benzene was stirred for 15 hours at 5° C. The precipitate of diphenylurea was removed by filtration and after concentrating the filtrate, it was extracted wih hot n-hexane. Upon cooling, there were obtained crystals of trimethylsilyl-substituted trimer of malononitrile melting at 170–171° C., and having the structure

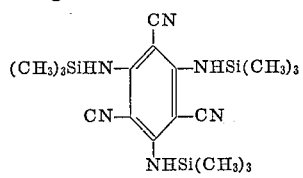

Analyses established this structure: percent C: 52.0 (52.1); percent H: 7.3 (7.5); percent N: 20.2 (20.2); molecular weight—421 (417 theory). Hydroylsis in ethanol yielded the desilylated compound, a colorless solid melting at 400° C. (decomposition) as shown by the following analyses: percent C: 54.5 (54.5); percent H: 3.0 (3.2); percent N: 42.5 (42.3).

Example 10

A mixture of 0.88 gram N,N-dimethylurea and 2.84 grams of silyl donor compound No. 1 suspended in 3 cc. of acetonitrile was warmed for about 1 minute until a clear solution was obtained. Precipitation of diphenylurea started after a few minutes. The mixture was stirred for several hours at 35° C., filtered, the solvent evaporated, and the residue sublimed at 40° C./0.5 mm. to give a solid having a melting point of 125–9° C. Analysis of the compound showed it to be N,N-dimethyl-N'-trimethylsilylurea, as evidenced by the analyses: percent C: 45.3 (45.0); percent H: 10.0 (10.0); percent N: 17.1 (17.5).

Example 11

A suspension of 1 mole of thiourea in a solution of 1 mole of silyl donor compound No. 1 and 1.5 grams of acetonitrile were stirred at 35° C. for 15 hours. After this time, the thiorea had gone into solution and a precipitate of diphenylurea mixed with silylthiourea had formed. The mixture was heated to reflux, filtered, the solvent evaporated, and a white residue obtained which, upon sublimation, yielded a compound having a melting point of 155–158° C. Analysis of the compound showed it to be N,N'-bis(trimethylsilyl)thiourea as evidenced by the analyses which showed: percent C: 38.1 (38.1); percent H: 9.2 (9.1); percent N: 17.9 (17.7); percent Si: 25.6 (25.5).

Example 12

A mixture of 1 gram of guanidine and 14.5 grams of silyl donor compound No. 1 and 30 cc. of acetonitrile formed a precipitate of diphenylurea immediately. The reaction was allowed to come to completion by stirring at 35° C. for 3 hours. Distillation of the product after filtration gave tris(trimethylsilyl)guanidine, this liquid boiling at 40° C./0.5 mm.; the structure was identified by analyses which showed for $C_{10}H_{29}N_3Si_2$: percent C: 43.6 (43.5); percent H: 10.6 (10.6); percent N: 15.7 (15.3).

Example 13

About 5 grams acetylacetone was mixed with 14 grams of silyl donor compound No. 1 and 25 cc. dry benezene. The precipitation of diphenylurea started in a few minutes. The reaction was completed by stirring at room temperature for 15 hours. The filtrate was distilled to obtain trimethylsilylacytylacetone ($C_8H_{16}O_2Si$) boiling at 102–3° C./35 mm., as evidenced by the analyses which showed: percent C: 55.9 (55.8); percent H: 9.2 (9.3); percent Si: 16.0 (16.3).

Example 14

About 0.21 gram N.N'-diphenylurea was mixed with 1 gram of $DCCl_3$ and 0.41 gram of silyl donor compound No. 2. The mixture was stirred at 35° C. for about 2 hours. Diphenylurea was dissolved after this time. There was thus obtained the compound bis(trimethylsilyl)diphenylurea.

Example 15

The mixing of equimolar quantities of aniline and silyl donor compound No. 2 in $DCCl_3$ led to almost instantaneous quantitative formation of N-trimethylsilyl aniline.

Example 16

When equimolar concentrations of 2,6-xylenol and silyl donor compound No. 2 in a small amount of benzene were mixed together, an exothermic reaction resulted to give 2,6-dimethylxylenyl-trimethylsilyl ether.

Example 17

In this example, to a suspension of 0.29 gram of 1,3-diphenyldisiloxanediol-1,3 in about 1 gram of carbon tetrachloride was added 0.41 gram of silyl donor compound No. 2. A rapid reaction occurred, as indicated by the disappearance of the diol and the formation of octamethyldiphenyltetrasiloxane which was established by its proton magnetic resonance spectrum to have the formula

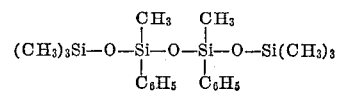

Example 18

A mixture of 1.5 grams of dimedone and 4.0 grams of silyl donor compound No. 2 dissolved in about 3 cc. of benzene was allowed to stand at room temperature for about 15 hours. The colorless clear solution was then subjected to a vacuum of 0.5 mm. and stirred at 35° C. Trimethylsilylacetamide sublimed into the colder parts of the apparatus and finally into a liquid nitrogen trap. The operation was finished after about 3 hours. The remaining colorless liquid crystallized at room temperature and was identified by NMR spectrum as being trimethylsilyldimedone.

Example 19

When the other products found in Table I of Example 6 are used as silyl donors with silyl acceptor compositions such as aliphatic alcohols, phenolic alcohols, hydroxy compounds, etc., the triorganosilyl group is readily transferred merely by interaction of the silyl donor with the silyl acceptor compound, at room temperature.

Example 20

A suspension of 1.1 grams of diketopiperazine in a solution of 5.7 grams trimethylsilyldiphenylurea (silyl donor compound No. 1) in 5 cc. of acetonitrile was stirred for 24 hours at 35° C. under anhydrous conditions. The diketopiperazine went into solution while diphenylurea precipitated. The mixture was filtered, the solvent evaporated, and the crystalline residue sublimed. There was thus obtained N,N'-bis(trimethylsilyl)piperazine which was established to be the desired compound, as evidenced by the analyses which showed percent C: 46.4 (46.4); percent H: 8.8 (8.6); percent Si: 21.7 (21.7).

Example 21

A suspension of 6.75 grams of oxindole in 10 cc. benzene was stirred with 21 grams of bis(trimethylsilyl)-acetamide (silyl donor compound No. 2) under anhydrous conditions at 30° C. The oxindole went into solution within about 1 hour as it was converted into its disilyl derivative. The mixture was then fractionally distilled to obtain the product N,O-bis(trimethylsilyl)oxindole boiling at 85–90° C./0.5 mm. and having the formula

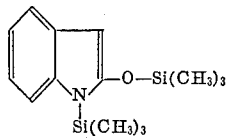

Example 22

N-trimethylsilylacetamide was prepared similarly as above by effecting reaction between 1 mol of acetamide and 1 mol of trimethylchlorosilane, by heating in the presence of pyridine as the hydrohalide acceptor, at a temperature of about 40° C. for about 30 minutes. After precipitation of the hydrohalide salt, the trimethylsilyl-acetamide derivative having the formula

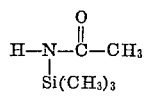

was obtained.

Example 23

In this example, the use of the trimethylsilylacetamide of Example 22 as a silyl donor was demonstrated by first dissolving 2.46 grams of 2,6-diphenylphenol in 5 cc. dry benzene and then adding 1.35 grams of the aforesaid trimethylsilylacetamide. The solution was stirred for about 12 hours at room temperature under anhydrous conditions. The precipitated acetamide which formed was removed by filtration, the solvent then removed and the white crystalline residue was recrystallized from dry n-hexane to give 2,6-diphenylphenyltrimethylsilyl ether having a melting point of 108–109° C.

Example 24

A mixture of 0.29 gram of 1,3-dimethyl-1,3-diphenyl-disiloxanediol-1,3, 0.13 gram of the N-trimethylsilylacetamide of Example 22 and 2 cc. benzene were stirred at room temperature under anhydrous conditions for 1 hour. The precipitate of acetamide was removed and after removal of the solvent, the reaction product was then isolated and established to be octamethyldiphenyltetra-siloxane of the formula

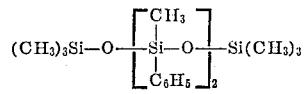

Example 25

The compound N,N - bis(trimethylsilyl) formamide having the formula

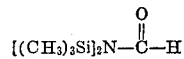

was prepared by adding 250 grams trimethylchlorosilane to a suspension of 45 grams formamide in 550 grams of triethylamine. The reaction mixture was heated with stirring at its reflux temperature for about 12 hours, at the end of which the precipitated triethylamine hydrochloride was removed by filtration. The remaining product was subjected to fractional distillation to obtain a compound which was identified as having the above-described formula and boiling at 71–73° C./35 mm. and a refractive index $n_D^{20} = 1.4395$.

When the silylated formamide of Example 25 was reacted in equimolar concentrations with hydroquinone, there was obtained the disilylated ether of the hydroquinone, i.e., a hydroquinone ether in which there are present one trimethylsilyl group on each oxygen. This example shows the marked silylating reactivity of the disilyl formamide.

In addition to the above examples of silylation, one can also mix a disilylurea, e.g., N,N'-bis(trimethylsilyl)-N,N'-diphenylurea with a dipeptide, such as N-methyl-DL-alanylglycin in a suitable solvent, for instance, acetonitrile, to give a trisilylpeptide according to the following equation:

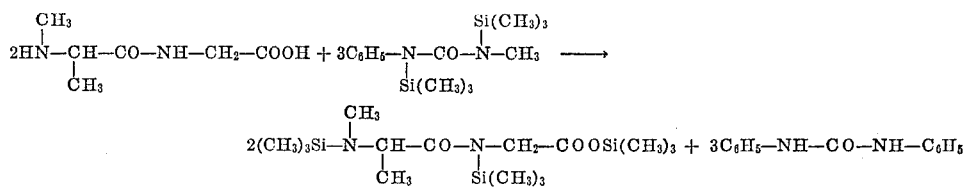

Such trisilylpeptides can then be converted to polypeptides.

Another instance where my process can be used is in the silylation of a sugar, like sucrose, which may be effected by mixing 3 mols of disilylurea, e.g., N,N'-bis(trimethylsilyl)-N,N'-diphenylurea, with 1 mol of sucrose in pyridine at room temperature, to give hexa-O-trimethylsilylsucrose within several minutes, which then may be separated from impurities by distillation. Hydrolysis with aqueous alcohol affords the purified sucrose.

It will, of course, be apparent to those skilled in the art that in addition to the ingredients given above, other silyl donors within the scope of Formula I and other silyl acceptors, again many examples of which have been given above, many be employed without departing from the scope of the invention. The conditions whereby the silylation reaction is carried out may also be varied as is indicated previously by the disclosures and examples.

What I claim as new and desire to secure by Letters Patent of the United States is:

1. The process for transferring silyl groups onto a silyl acceptor compound containing at least one acidic proton which comprises reacting the latter compound with a silyl donor compound having the formula:

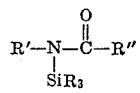

wherein R is a monovalent hydrocarbon radical selected from the class consisting of alkyl, alkenyl, aryl, aralkyl, alkaryl and cycloaliphatic radicals, R' is a member of the class consisting of hydrogen, a monovalent hydrocarbon radical selected from the class consisting of alkyl, alkenyl, aryl, aralkyl, alkaryl and cycloaliphatic radicals or the SiR₃ group where R is as above-defined and R'' is a member of the class consisting of hydrogen, a monovalent hydrocarbon radical selected from the class consisting of alkyl, alkenyl, aryl, aralkyl, alkaryl and cycloaliphatic radicals and the

radical where Z is selected from the class consisting of hydrogen, a monovalent hydrocarbon radical selected from the class consisting of alkyl, alkenyl, aryl, aralkyl, alkaryl and cycloaliphatic radicals or the $SiR_3$ radical, wherein R is as above-defined, and the monovalent hydrocarbon radicals represented by R, R', R'' and Z can contain up to and including 12 carbon atoms.

2. The process as in claim 1 in which the silyl donor compound is N-trimethylsilyl-N,N'-diphenylurea and the silyl acceptor compound is nitromethane.

3. The process as in claim 1 in which the silyl donor compound is N-trimethylsilyl-N,N'-diphenylurea and the silyl acceptor compound is malononitrile.

4. The process as in claim 1 in which the silyl donor compound is N-trimethylsilyl-N,N'-diphenylurea and the silyl acceptor compound is N,N-dimethylurea.

5. The process as in claim 1 in which the silyl donor compound is N-trimethylsilyl-N,N'-diphenylurea and the silyl acceptor compound is thiourea.

6. The process as in claim 1 in which the silyl donor compound is N-trimethylsilyl-N,N'-diphenylurea and the silyl acceptor compound is acetylacetone.

7. The process as in claim 1 in which the silyl donor compound is bis(trimethylsilyl)acetamide and the silyl acceptor compound is N,N'-diphenylurea.

8. The process as in claim 1 in which the silyl donor compound is bis(trimethylsilyl)acetamide and the silyl acceptor compound is aniline.

9. The process as in claim 1 in which the silyl donor compound is bis(trimethylsilyl)acetamide and the silyl acceptor compound is 2,6-xylenol.

10. The process as in claim 1 in which the silyl donor compound is bis(trimethylsilyl)acetamide and the silyl acceptor compound is 1,3-dimethyl-1,3-diphenyl-disiloxanediol-1,3.

11. The process as in claim 1 in which this silyl compound is N-trimethylsilyl acetamide and the silyl acceptor compound is 2,6-diphenylphenol.

12. The compound N,N-bis(trimethylsilyl)formamide.

References Cited

UNITED STATES PATENTS

| | | |
|---|---|---|
| 2,876,209 | 3/1959 | De Benneville et al. 260—448.2 XR |
| 2,876,234 | 3/1959 | Hurwitz et al. __ 260—448.2 XR |
| 2,906,756 | 9/1959 | De Benneville et al. 260—448.2 XR |

TOBIAS E. LEVOW, *Primary Examiner.*

P. F. SHAVER, *Assistant Examiner.*